(12) United States Patent
Fujioka

(10) Patent No.: US 9,262,995 B2
(45) Date of Patent: Feb. 16, 2016

(54) IMAGE PROJECTION APPARATUS AND CONTROL METHOD THEREFOR

(75) Inventor: Nobuhide Fujioka, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 110 days.

(21) Appl. No.: 14/353,010

(22) PCT Filed: Dec. 20, 2011

(86) PCT No.: PCT/JP2011/079500
§ 371 (c)(1), (2), (4) Date: Apr. 18, 2014

(87) PCT Pub. No.: WO2013/094011
PCT Pub. Date: Jun. 27, 2013

(65) Prior Publication Data
US 2014/0240378 A1    Aug. 28, 2014

(51) Int. Cl.
| | |
|---|---|
| G09G 5/10 | (2006.01) |
| G02B 27/10 | (2006.01) |
| G03B 21/20 | (2006.01) |
| H04N 9/31 | (2006.01) |
| G02B 26/06 | (2006.01) |
| G02B 27/14 | (2006.01) |

(52) U.S. Cl.
CPC .............. *G09G 5/10* (2013.01); *G02B 27/1066* (2013.01); *G03B 21/208* (2013.01);
(Continued)

(58) Field of Classification Search
CPC .............. G02B 26/06; G02B 27/1066; G03B 21/2053; G09G 5/10; G09G 2320/0646; G09G 2360/16; G09G 3/3426; G09G 2320/0233; G09G 3/3406; H04N 9/3155; H04N 9/3161; H04N 9/3182
USPC .............. 345/690, 87–102; 348/40; 359/9, 15, 359/22, 25–26, 27, 29–33, 276–279, 284, 359/289, 443–461, 641
See application file for complete search history.

(56) References Cited

U.S. PATENT DOCUMENTS

| | | | |
|---|---|---|---|
| 6,731,819 B1 * | 5/2004 | Fukushima et al. | 382/260 |
| 2007/0024999 A1 * | 2/2007 | Crossland et al. | 359/859 |

(Continued)

FOREIGN PATENT DOCUMENTS

| | | |
|---|---|---|
| JP | 2008-544307 A | 12/2008 |
| JP | 2010-501900 A | 1/2010 |

(Continued)

OTHER PUBLICATIONS

International Search Report (ISR) (PCT Form PCT/ISA/210), in PCT/JP2011/079500, dated Jan. 31, 2012.

*Primary Examiner* — Hong Zhou
(74) *Attorney, Agent, or Firm* — McGinn IP Law Group, PLLC

(57) ABSTRACT

The image projection apparatus of the present invention includes a light source that outputs coherent light; a phase modulator that performs phase modulation on the light output from the light source to create a Fourier transform image; an amplitude modulator that performs amplitude modulation on the Fourier transform image in accordance with an image signal; a projection optical system that projects the light that has been amplitude modulated, and a controller that divides the image represented by the image signal into a plurality of divided images, determines the target luminance value of each of the areas of the Fourier transform image that is divided corresponding to the division of the image, based on the image signal, and outputs phase data indicating the amount of phase modulation so as to make the luminance value of each area of the Fourier transform image acquire the target luminance value of the associated area.

8 Claims, 8 Drawing Sheets

(52) U.S. Cl.
CPC ......... *G03B 21/2053* (2013.01); *H04N 9/3155* (2013.01); *H04N 9/3161* (2013.01); *H04N 9/3182* (2013.01); *G02B 26/06* (2013.01); *G02B 27/149* (2013.01)

(56) References Cited

U.S. PATENT DOCUMENTS

2010/0000978 A1* 1/2010 Matsumoto et al. ..... 219/121.72
2010/0014136 A1 1/2010 Haussler
2010/0020289 A1 1/2010 Kamijima
2010/0188435 A1* 7/2010 Kim et al. ..................... 345/690
2011/0002019 A1 1/2011 Routley et al.

FOREIGN PATENT DOCUMENTS

| | | |
|---|---|---|
| JP | 2010-49236 A | 3/2010 |
| JP | 2010-197916 A | 9/2010 |
| JP | 2011-508911 A | 3/2011 |

* cited by examiner

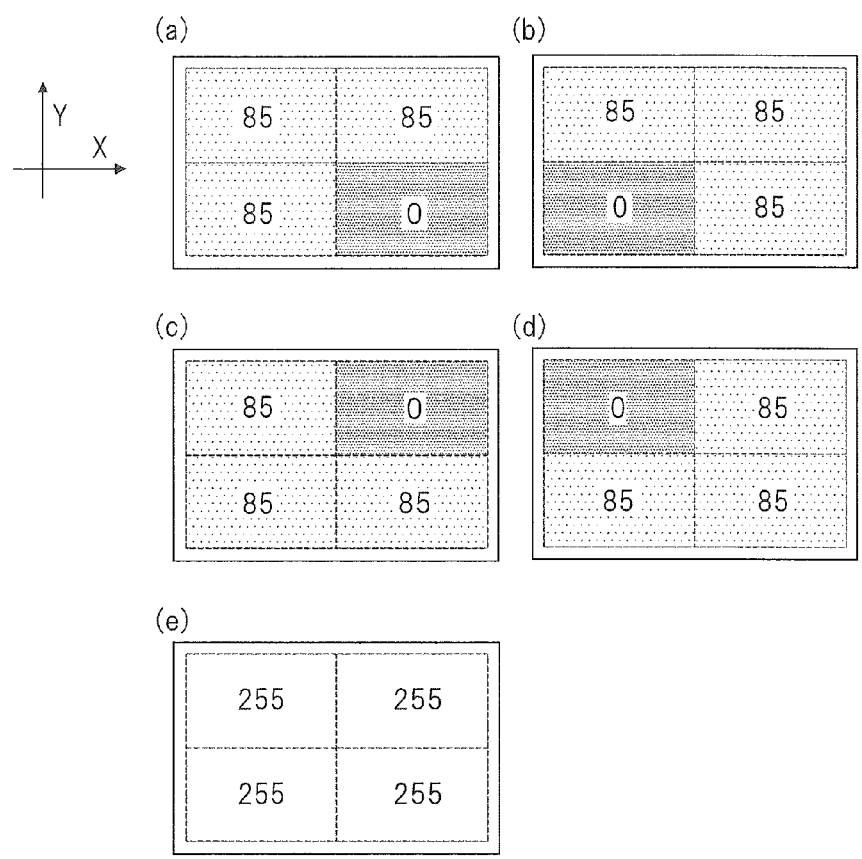

IMAGE PROJECTION APPARATUS AND CONTROL METHOD THEREFOR

TECHNICAL FIELD

The present invention relates to an image projection apparatus for projecting the image and a control method therefor.

BACKGROUND ART

Meeting the demand for a display apparatus that can display images represented by an image signal involves developing high contrast and low power consumption configurations and the like. To meet these demands, a local dimming technique is used.

Local dimming is a technique in which the image represented by the image signal is divided into a plurality of divided images and the brightness of each divided image is adjusted in accordance with the brightness level such as the luminance value or the like of each divided image so as to make a dark divided image appear darker and a bright divided image appear brighter.

For example, in the liquid crystal display using LED (Light Emitting Diode) as its backlight, local dimming can be implemented by lowering the output of backlight in the area where the dark divided image is displayed. Since lowering the output of backlight in the area where a dark divided image is displayed makes the dark divided image appear darker, the dynamic range of the displayed image can be widened, hence high-contrast display can be achieved. Further, lowering the output of backlight can also achieve low power consumption.

As the division number of the image is increased in local dimming, the brightness of each of the pixels that form the image will be adjusted last.

An organic EL (Electro Luminescence) display can be regarded as a display in which the brightness of each of the pixels can be adjusted. However, organic EL displays suffer from the problem in which the lifetime of the light source is not sufficiently long.

An image projection apparatus that projects the image by scanning the laser beam output from a light source by use of a MEMS (Micro Electro Mechanical Systems) mirror, can be regarded as another kind of display in which the brightness of each of the pixels can be adjusted.

There are image projection apparatuses other than the image projection apparatus that use the aforementioned MEMS mirror, such as ones that project the image by performing amplitude modulation on the light output from a lamp, LED, laser light source or the like by means of a display device such as a liquid crystal panel, DMD (Digital Micro mirror Device), in accordance with the image signal. These image projection apparatuses can project the image with a simpler configuration compared to the image projection apparatus using a MEMS mirror.

Patent Document 1 (JP2008-544307A) discloses an image projection apparatus which projects the image by performing phase modulation on the laser beam output from the light source in accordance with the image signal. According to the image projection apparatus disclosed in Patent Document 1, it is possible to promote low power consumption because phase modulation on the light output from the light source will not cause any optical loss, unlike in the case of amplitude modulation.

RELATED ART DOCUMENT

Patent Document

Patent Document 1: JP2008-544307A

SUMMARY

Problems to be Solved by the Invention

In the image projection apparatus using the MEMS mirror, a problem occurs in which it is not easy to achieve high resolution of the displayed image by improving the characteristics of the MEMS mirror.

In the image projection apparatus using amplitude modulation to project the image, since the light output from the light source is shaped into a rectangle and homogenized by an integrator and radiated on the display device, the brightness of light radiated on the display device varies in the same manner over all the pixels, so that it is impossible to realize local dimming.

In the image projection apparatus disclosed in Patent Document 1, it is necessary to compute the phase data for performing phase modulation on a frame basis so as to display the image represented by the image signal. However, computation of such phase data requires an enormous processing load, which is a problem.

Accordingly, all kinds of image projection apparatus described above have a problem in which local dimming cannot be realized with a simple configuration.

The object of the present invention is to provide an image projection apparatus and a control method of the image projection apparatus that can realize local dimming with a simple configuration.

Means for Solving the Problems

In order to achieve the above object, an image projection apparatus of the present invention is an image projection apparatus for projecting an image represented by an input image signal, and includes:

a light source that outputs coherent light;

a phase modulator that performs phase modulation on the light output from the light source to create a Fourier transform image;

an amplitude modulator that performs amplitude modulation on the Fourier transform image in accordance with the image signal;

a projection optical system that projects the light that has been amplitude modulated by the amplitude modulator; and, a controller that divides the image represented by the image signal into a plurality of divided images, determines the target luminance value of each of the areas of the Fourier transform image that is divided corresponding to the division of the image, based on the image signal of the divided image corresponding to the area, and outputs phase data indicating the amount of phase modulation on the output light from the light source so as to make the luminance value of each area of the Fourier transform image acquire the target luminance value of the associated area.

In order to achieve the above object, a control method of an image projection apparatus of the present invention is a control method of an image projection apparatus that includes a light source that outputs coherent light to project an image represented by an input image signal by modulating the light output from the light source in accordance with the image signal, and comprises:

a phase modulating step of performing phase modulation on the light output from the light source to create a Fourier transform image;

an amplitude modulating step of performing amplitude modulation on the Fourier transform image in accordance with the image signal; and a projecting step of projecting the amplitude-modulated light, wherein, at the phase modulating step, phase modulation is performed by dividing the image represented by the image signal into a plurality of divided images, determining the target luminance value of each of the areas of the Fourier transform image that is divided corresponding to the division of the image, based on the image signal in the divided image corresponding to the area so as to make the luminance value of each area of the Fourier transform image acquire the target luminance value of the associated area.

Effect of the Invention

According to the present invention, it is possible to realize local dimming with a simple configuration.

BRIEF DESCRIPTION OF THE DRAWINGS

FIG. 8B A diagram showing one example of light intensity profiles of Fourier transform images formed by the light output from individual light sources shown in FIG. 7 and the light intensity profile of the Fourier transform image radiated on the amplitude modulator.

EXEMPLARY EMBODIMENT

An exemplary embodiment of the present invention is next described with reference to the accompanying drawings.

The First Exemplary Embodiment

Figure 1:
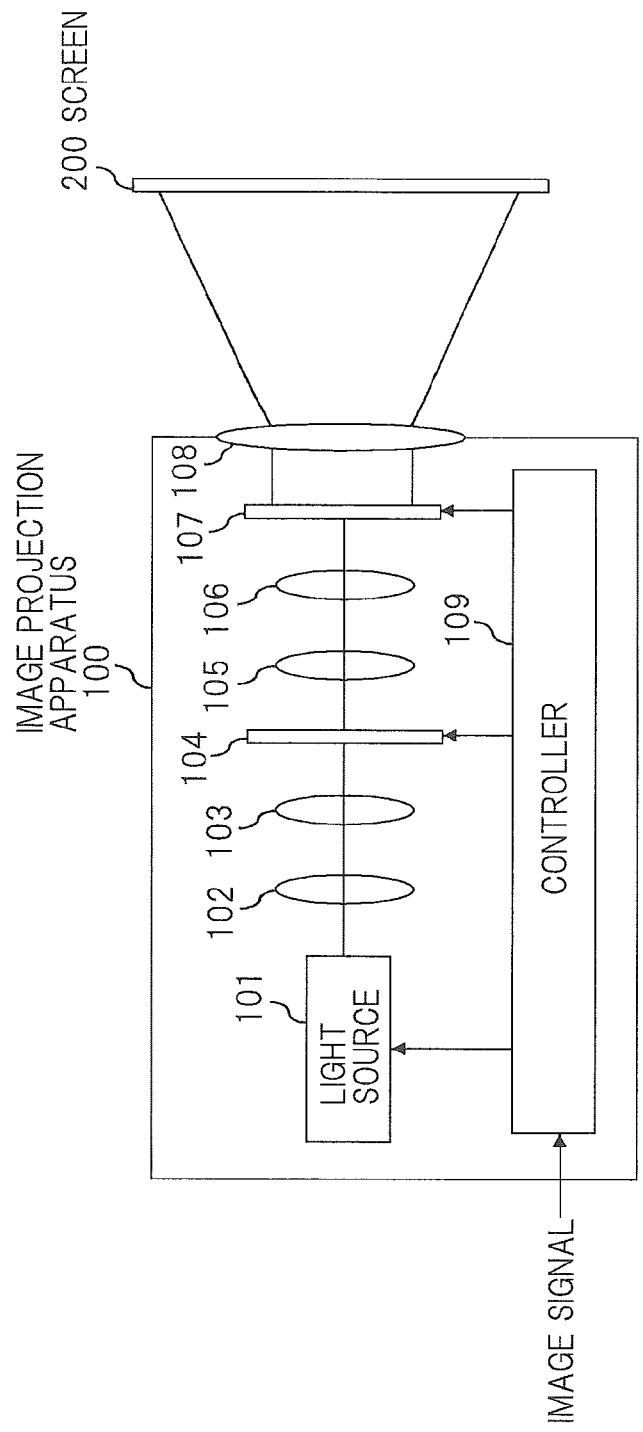
FIG. 1 A diagram showing a configuration of an image projection apparatus of the first exemplary embodiment of the present invention.

FIG. 1 is a diagram showing a configuration of image projection apparatus 100 of the first exemplary embodiment of the present invention.

Image processing apparatus 100 shown in FIG. 1 includes light source 101, lenses 102, 103, 105, 106, phase modulator 104, amplitude modulator 107, projection optical system 108 and controller 109.

Light source 101 outputs coherent light (laser beam) to lens 102.

Lens 102 magnifies the output light from light source 101 and outputs the magnified light to lens 103.

Lens 103 collimates the output light input from lens 102 and outputs the collimated light to phase modulator 104.

Phase modulator 104 performs phase modulation on the light input from lens 103 and outputs the phase-modulated light to lens 105. Here, specific examples of phase modulator 104 include LCOS (Liquid crystal on silicon), computer generated hologram (CGH: Computer Generated Hologram) and others.

Lens 105 collimates the light input from phase modulator 104 and outputs the collimated light to lens 106.

Lens 106 condenses the light input from lens 105 and radiates the condensed light on amplitude modulator 107.

Passing through lens 105 and lens 106, the light that has been phase modulated by phase modulator 104 is formed into a Fourier transform image, which is made to illuminate amplitude modulator 107.

Amplitude modulator 107 performs amplitude modulation on the illuminated Fourier transform image in accordance with the image signal, and outputs the amplitude-modulated light to projection optical system 108.

Projection optical system 108 projects the light input from amplitude modulator 107 onto screen 200.

Controller 109, upon receiving an image signal from an external signal source, controls the driving of light source 101, phase modulator 104 and amplitude modulator 109 in accordance with the input image signal. Details of the operation of controller 109 will be described later.

Here, it is theoretically possible to arbitrarily adjust the brightness distribution of the Fourier transform image by means of phase modulator 104. Accordingly, in image projection apparatus 100 shown in FIG. 1, it is possible to project the image represented by the image signal on screen 200 via projection optical system 108, by performing phase modulation on the output light from light source 101 by means of phase modulator 104 without use of amplitude modulator 107. However, computing the phase data for performing phase modulation on every frame so as to enable the image represented by the image signal to be projected by phase modulation only, entails a problem in which an enormous amount processing load is imposed on controller 109.

For this reason, in the present exemplary embodiment, phase modulator 104 is used to realize local dimming only.

Now, the operation of image projection apparatus 100 will be described focusing on the operation of controller 109.

Controller 109 stores a finite number of light intensity profiles that indicate a target luminance values of individual areas of the Fourier transform image corresponding to the division of the image represented by the image signal. Controller 109 also stores, in response to the light intensity profile, phase data that indicates the amount of phase modulation on the output light from light source 101 so as to make the luminance value of each area of the Fourier transform image radiated on amplitude modulator 107 acquire the target luminance value of the area indicated by the light intensity profile.

Figure 2:
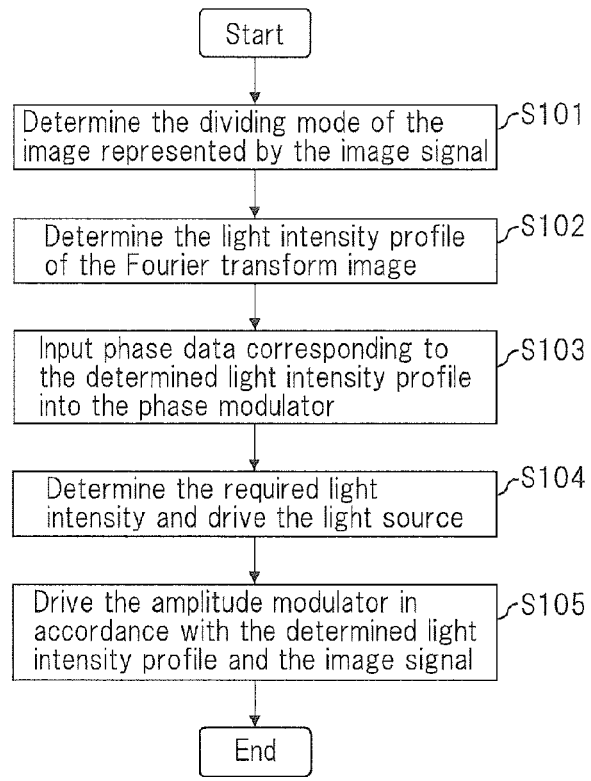
FIG. 2 A flow chart showing the operation of the controller shown in FIG. 1.

FIG. 2 is a flow chart showing the operation of controller 109.

Upon receiving the image signal, controller 109 determines the dividing mode of the image such as the division number of the image and the like, based on the luminance distribution of the pixels of the image given by the image signal. Here, controller 109 determines the dividing mode so that each of the divided images corresponds to the division of the Fourier transform image in the stored light intensity profiles (Step S101).

Next, controller 109 determines a representative gradation value for each of the divided images into which the image given by the image signal is divided in accordance with the determined dividing mode. Here, for example, controller 109 determines the representative gradation value, using the occurrence distribution (histogram) of the gradation values of the pixels in the divided image. Further, controller 109, based on the determined representative gradation value and the gamma characteristic, determines the target luminance value of each area of the Fourier transform image corresponding to each divided image.

Next, controller 109 determines the light intensity profile that coincides with, or is an approximation of, the determined target luminance value of each area, from among the stored light intensity profiles (Step S102).

Next, controller 109 inputs the phase data stored corresponding to the determined light intensity profile, to phase modulator 104 (Step S103), and drives phase modulator 104. In this way, by selecting phase data in accordance with the image signal, from the phase data stored beforehand, instead of computing phase data every time, it is possible to prevent an increase in the processing load on controller 109.

Next, controller 109 determines the required amount of light to be output from the light source, in accordance with the determined light intensity profile and drives light source 101 so as to output the determined amount of light (Step S104).

Further, controller 109 controls the driving of amplitude modulator 107, in accordance with the image signal and the determined light intensity profile so that an image corresponding to the image signal will be projected appropriately (Step S105).

Here, since phase modulation will not modulate light intensity, theoretically, there is no absorption and loss of light, therefore, neither thermal degradation of phase modulator 104 nor degradation of light utilization will occur.

When only a specific area of the Fourier transform image is irradiated with light, the amount of light for the divided image corresponding to that area may be output from light source 101.

Figure 3A:
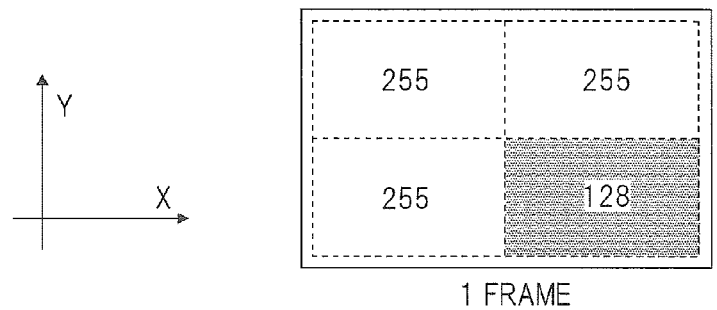
FIG. 3A A diagram showing one example of a light intensity profile of the Fourier transform image radiated on the amplitude modulator shown in FIG. 1.

FIG. 3A is a diagram showing one example of a light intensity profile of the Fourier transform image radiated on amplitude modulator 107 when one frame of image is displayed.

It is assumed hereinbelow that the image represented by the image signal is divided in two in both the X-direction and in Y-direction, i.e., into four divided images. Corresponding to the division of the image represented by the image signal, the Fourier transform image is also divided in two in both the X-direction and in Y-direction, i.e., into four areas, as shown in FIG. 3A.

In the light intensity profile shown in FIG. 3A, the target luminance values of the upper left, lower left and upper right areas of the Fourier transform image are 255 while the target luminance value of the lower right area is 128.

Figure 3B:
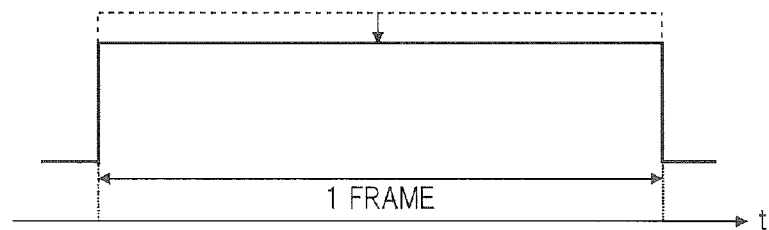
FIG. 3B A diagram showing one example of an output waveform of light output from the light source in accordance with the light intensity profile shown in FIG. 3A.

FIG. 3B is a diagram showing one example of an output waveform of light output from light source 101 in one frame period in accordance with the light intensity profile shown in FIG. 3A. Here, in FIG. 3B, the solid line shows the output waveform of light output from light source 101 in accordance with the light intensity profile shown in FIG. 3A, whereas the broken line shows the output waveform of light output from light source 101 in accordance with the light intensity profile of which all the four areas of the Fourier transform image have a target luminance value of 255.

As shown in FIG. 3B, when there is an area having a low target luminance value, it is possible to allocate light from the area with a low target luminance value to the area with a high target luminance value by phase modulation, so that the amount of light to be output from light source 101 can be reduced. Reduction of the amount of light output from light source 101 can be implemented by lowering the injection current to light source 101, for instance.

As described above, since light can be allocated from the area with a low target luminance value to the area with a high target luminance value, it is possible to supply the required amount of light to each of the areas of the Fourier transform image while reducing the amount of light output from light source 101, thereby realizing low-power consumption. This, at the same time, means that a specific area can be displayed brighter, depending on the image represented by the image signal when the unvaried amount of light is output from light source 101.

Further, for the area with a low target luminance value, it is possible to lower the leak light level when light is shaded by amplitude modulator 107, hence contrast of the displayed image is increased.

It should be noted that it is not easy to keep the light intensity of each area of the Fourier transform image strictly constant. Further, there is a risk that a steep change of light intensity cannot be obtained at the boundary between areas. Therefore, it is preferable that the light intensity profile be fully understood so that amplitude modulator 107 can be operated in accordance with that result.

Although, with FIG. 3B, an example in which the amount of light output from light source 101 is lowered over the full duration of one frame period, was described, the embodiment should not be limited to this.

Figure 3C:
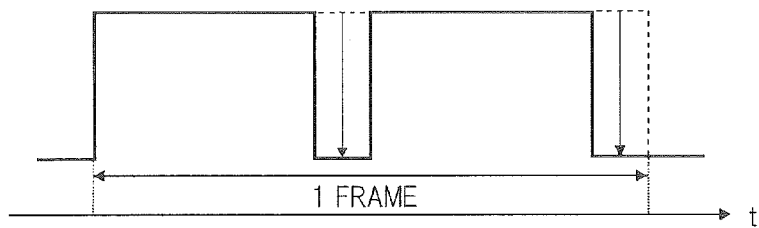
FIG. 3C A diagram showing one example of an output waveform of light output from the light source in accordance with the light intensity profile shown in FIG. 3A.

FIG. 3C is a diagram showing another example of an output waveform of light output from light source 101 during one frame period in accordance with the light intensity profile shown in FIG. 3A. Here, in FIG. 3C the solid line shows the output waveform of light output from light source 101 in accordance with the light intensity profile shown in FIG. 3A, whereas the broken line shows the output waveform of light output from light source 101 in accordance with the light intensity profile of which all four areas of the Fourier transform image have a target luminance value of 255.

As shown in FIG. 3C, the amount of light output from light source 101 may be reduced by the so-called PWM (Pulse Width Modulation), that is, by adjusting on-off durations of the light output from light source 101 in one frame period.

Though description with FIGS. 3A to 3C was made by giving examples in which the amount of light output from light source 101 in one frame period is controlled in accordance with the light intensity profile of the Fourier transform image corresponding to one frame of the image, the embodiment should not be limited to this.

For example, one frame is time-divided into a plurality of subframes to determine a light intensity profile of the Fourier transform image for every subframe, so that the amount of light output from light source 101 may be controlled based on the determined light intensity profiles. The operation in this case will be described with reference to FIGS. 4A to 4C.

Figure 4A:
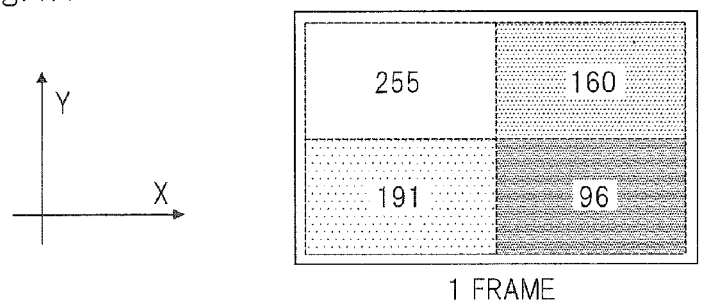
FIG. 4A A diagram showing one example of a light intensity profile of the Fourier transform image radiated on the amplitude modulator shown in FIG. 1.

FIG. 4A is a diagram showing one example of a light intensity profile of the Fourier transform image corresponding to one frame of image.

In this light intensity profile shown in FIG. 4A, the target luminance value of the upper left area of the Fourier transform image is 255, the target luminance value of the lower left area is 191, the target luminance value of the upper right area is 160, and the target luminance value of the lower right area is 96.

Controller 109 divides one frame into two subframes (subframe 1 and subframe 2) and determines the light intensity profile of the Fourier transform image corresponding to each subframe.

Figure 4B:
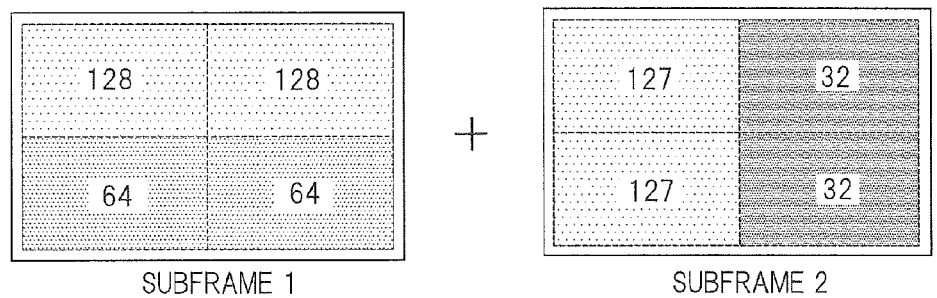
FIG. 4B A diagram showing one example of light intensity profiles on a subframe basis, corresponding to the light intensity profile shown in FIG. 4A.

FIG. 4B is a diagram showing one example of a light intensity profile of the Fourier transform image corresponding to subframe 1 and a light intensity profile of the Fourier transform image corresponding to subframe 2.

As shown in FIG. 4B, in the light intensity profile of the Fourier transform image corresponding to subframe 1, the target luminance value of the upper left area of the Fourier transform image is 128, the target luminance value of the lower left area is 64, the target luminance value of the upper right area is 128, and the target luminance value of the lower right area is 64. In the light intensity profile of the Fourier transform image corresponding to subframe 2, the target luminance value of the upper left area of the Fourier transform image is 127, the target luminance value of the lower left area is 127, the target luminance value of the upper right area is 32, and the target luminance value of the lower right area is 32. Accordingly, the target luminance values of subframe 2 are overall lower than those of subframe 1. Here, the sum of the target luminance value of the upper left area in the Fourier transform image corresponding to subframe 1 and the target luminance value of the upper left area in the Fourier transform image corresponding to subframe 2 is equal to the target luminance value of the upper left area in the Fourier transform image corresponding to the one frame shown in FIG. 4A. Similarly, the sum of the associated target luminance values of the lower left, upper right or lower right area in the Fourier transform image for the two subframes is equal to the target luminance value of the corresponding area in the Fourier transform image for the one frame shown in FIG. 4A.

Controller 109 drives phase modulator 104 in the display duration of subframe 1 in accordance with the phase data stored for the light intensity profile corresponding to subframe 1, and drives phase modulator 104 in the display duration of subframe 2 in accordance with the phase data stored for the light intensity profile corresponding to subframe 2.

Further, controller 109 controls the amount of light output from light source 101 in accordance with the light intensity profile for subframe 1 in the display duration of subframe 1 and controls the amount of light output from light source 101 in accordance with the light intensity profile for subframe 2 in the display duration of subframe 2.

Figure 4C:
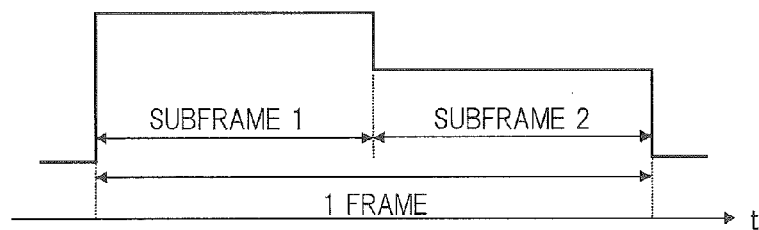
FIG. 4C A diagram showing one example of an output waveform of light output from the light source in accordance with the light intensity profile shown in FIG. 4B.

FIG. 4C is a diagram showing one example of an output waveform of light output from light source 101 in accordance with the light intensity profile shown in FIG. 4B.

As described above, the target luminance values of subframe 2 are overall lower than those of subframe 1. Accordingly, in the display duration of subframe 2, the amount of light output from light source 101 is lowered compared to that in the display duration of subframe 1.

Controller 109 controls the driving of amplitude modulator 107 in accordance with the light intensity profile for subframe 1, in the display duration of subframe 1, and controls the driving of amplitude modulator 107 in accordance with the light intensity profile for subframe 2, in the display duration of subframe 2.

In this way, by dividing one frame into a plurality of subframes to project the image by switching the light intensity profile every subframe, it is possible to temporally level off noises that arise when the gradation value of phase modulator 104 is low. Further, when the types of light intensity profiles and phase data stored in controller 109 are limited, it is possible to project the image represented by the image signal faithfully, by switching the light intensity profile every subframe, that is, by combining a plurality of light intensity profiles in one frame period.

Here, as described above, LCOS, CGH and the like can be used as phase modulator 104.

When an LOCOS is used as phase modulator 104, arbitrary phase data can be input within the ranges of the resolution and gradation value of the LCOS, and it is possible to obtain many kinds of light intensity profiles for the Fourier transform image, depending on the number of phase data storable in controller 109.

When a CGH is used as phase modulator 104, it can be thought that multiple horograms that have been pre-recorded are mechanically positioned so that a selection can be made in sequence to obtain a desired Fourier transform image from the holograms. In this case, the kinds of recordable holograms are limited depending on the mechanical positioning accuracy, the size of hologram, the spot size of the laser beam output from laser source 101 and other conditions. When the kinds of recordable holograms are limited, an effective method to drive the associated units is to divide one frame into a plurality of subframes so as to switch light intensity profiles every subframe, that is, so as to change the holograms to be used from the recorded holograms.

In this way, according to the present exemplary embodiment, image projection apparatus 100 divides the image represented by the image signal into a plurality of divided images, determines a target luminance value for each of the divided areas of the Fourier transform image corresponding to the division of the image, based on the image signal of the divided image corresponding to each area, and drives phase modulator 104 so as to make the luminance value of each area of the Fourier transform image radiated on amplitude modulator 107 acquire the target luminance value of the area.

Accordingly, since illumination on amplitude modulator 107 can be realized by adjusting the luminance value for each area of the Fourier transform image by phase modulation by means of phase modulator 104, it is hence possible to realize local dimming with a simple configuration.

Also, according to the present exemplary embodiment, image projection apparatus 100 stores in association with a light intensity profile that shows target luminance values for individual areas of the Fourier transform image and phase data that makes the luminance value of each area of the Fourier transform image radiated on amplitude modulator 107 acquire the target luminance value for each area indicated by the light intensity profile, determines a light intensity profile in accordance with the image signal, from the stored light intensity profiles, and drives phase modulator 104, based on the phase data stored in association with the determined light intensity profile.

Accordingly, it is no longer necessary to compute phase data every time, thus making it possible reduce the processing load.

Here, the present exemplary embodiment has been described by giving an example in which image projection apparatus 100 is equipped with only a single light source 101, but should not be limited to this.

Figure 5:
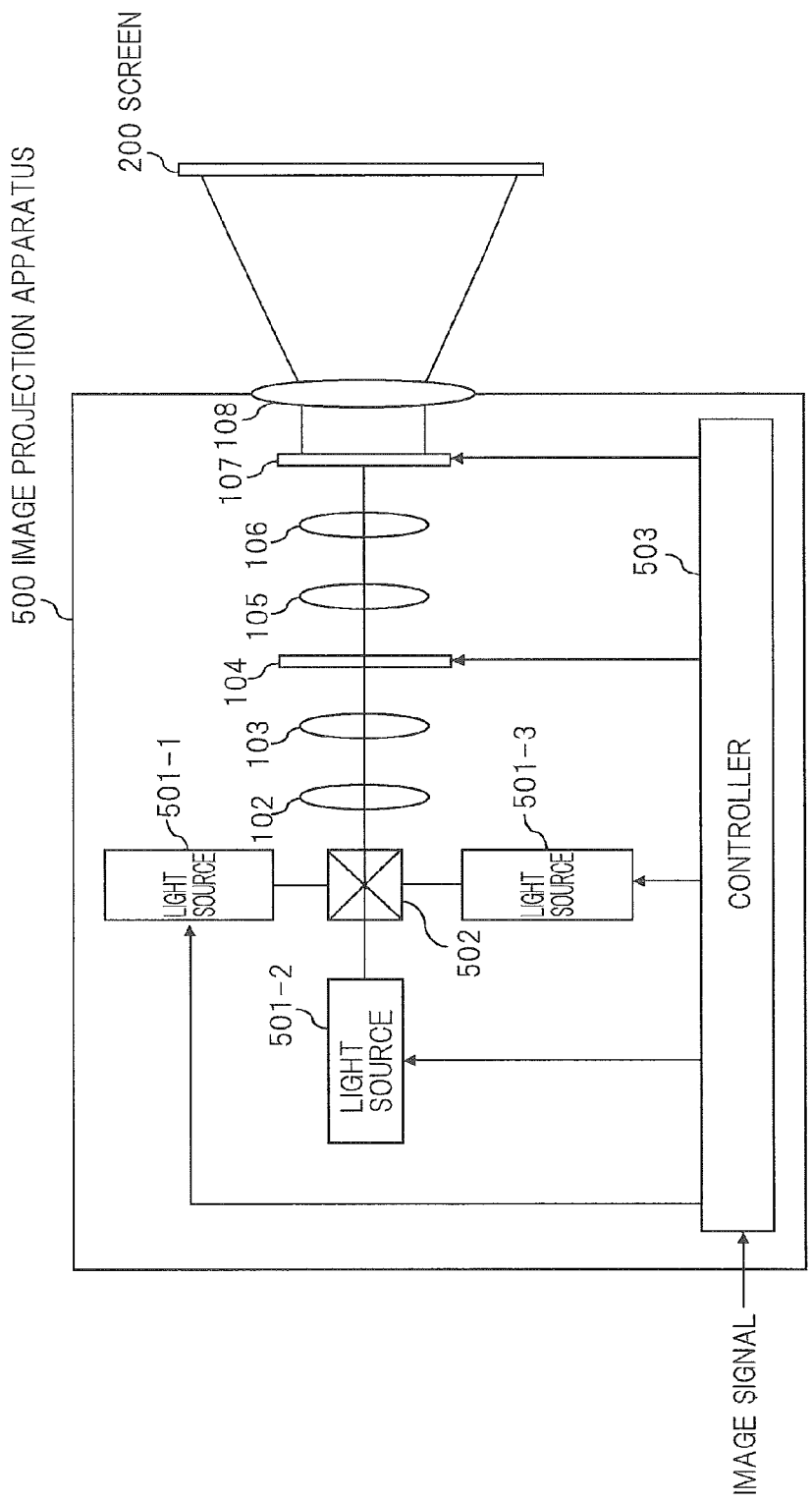
FIG. 5 A diagram showing another example of a configuration of an image projection apparatus of the first exemplary embodiment of the present invention.

FIG. 5 is a diagram showing another example of a configuration of an image projection apparatus of the first exemplary embodiment of the present invention. Here in FIG. 5, the same components as those in FIG. 1 are allotted the same reference numerals and description is accordingly omitted.

Image projection apparatus 500 shown in FIG. 5 is different from image projection apparatus 100 shown in FIG. 1, in that light source 101 is omitted while light sources 501-1 to 501-3 are added, cross prism 502 is added, and controller 109 is replaced by controller 503.

Light sources 501-1 to 501-3 each output coherent light (laser beam). Here, light sources 501-1 to 501-3 may either output any different colors of light such as red, green and blue, or may output the same color of light.

Cross prism 502 combines the light output from light sources 501-1 to 501-3 and outputs the combined light to lens 102.

When light sources 501-1 to 501-3 output different colors of light, a color image can be projected by making the output light from each light source incident on phase modulator 104 and amplitude modulator 107 in a time divisional manner.

On the other hand, when light sources 501-1 to 501-3 output the same color of light, it is possible to increase the intensity of light illuminating phase modulator 104 by combining the output light from the individual light sources by means of cross prism 502. Further, since, in general, the laser beams output from light sources 501-1 to 501-3 will not interfere with each other, the light intensity profile of the Fourier transform image radiated on amplitude modulator 107 is given by the sum of the light intensity profiles of the Fourier transform images formed by phase-modulations of the output light beams from the individual light sources. Accordingly, use of multiple light sources that output light of the same color increases the intensity of light illuminating phase modulator 104, thus making it possible to increase the brightness of the projected image.

Similarly to controller 109, controller 503 determines a light intensity profile in accordance with the image represented by the image signal and drives phase modulator 104 and amplitude modulator 107 in accordance with the determined light intensity profile. Controller 503 also controls the amount of light output from light sources 501-1 to 501-3 in accordance with the determined light intensity profile.

Though description with FIG. 5 was made by giving an example in which light beams output from multiple light sources 501-1 to 501-3 are combined through cross prism 502, then the combined light is output to lens 102, the embodiment should be limited to this.

Figure 6:
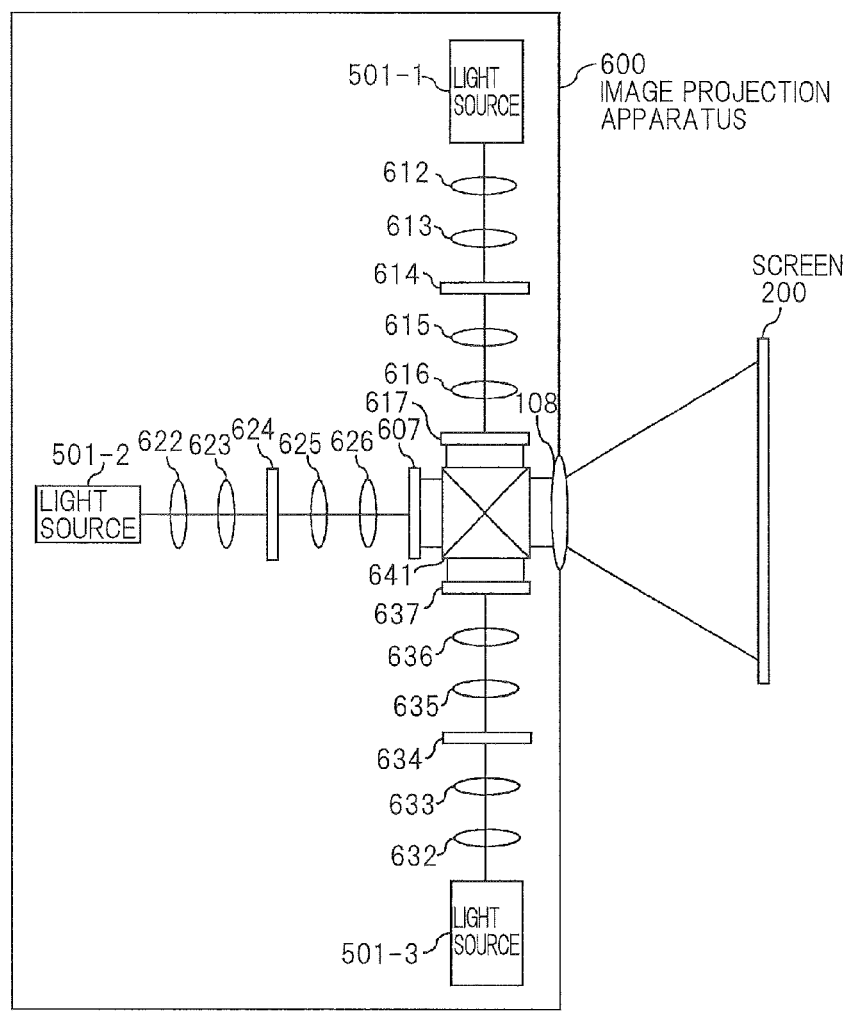
FIG. 6 A diagram showing another example of a configuration of an image projection apparatus of the first exemplary embodiment of the present invention.

FIG. 6 is another example of a configuration of an image projection apparatus of the first exemplary embodiment of the present invention. In FIG. 6, the same components as in FIG. 5 are allotted with the same reference numerals and description is accordingly omitted.

Image projection apparatus 600 shown in FIG. 6 is different from image projection apparatus 500 shown in FIG. 5, in that lenses 612, 613, 615, 616, phase modulator 614 and amplitude modulator 617 are provided for light source 501-1; lenses 622, 623, 625, 626, phase modulator 624 and amplitude modulator 627 are provided for light source 501-2; lenses 632, 633, 635, 636, phase modulator 634 and amplitude modulator 637 are provided for light source 501-3; and cross prism 502 is replaced by cross prism 641. In FIG. 6, the illustration of the controller is omitted.

Lenses 612, 622 and 632 magnify the output light from corresponding light sources 501-1 to 501-3 and output the magnified light to lenses 613, 623 and 633, respectively.

Lenses 613, 623 and 633 collimate the output light input from corresponding lenses 612, 622 and 632 and output the collimated light to phase modulators 614, 624, 634, respectively.

Phase modulators 614, 624 and 634 perform phase modulation on the light input from corresponding lenses 613, 623 and 633 and output the phase-modulated light to lenses 615, 625 and 635, respectively.

Lenses 615, 625 and 635 collimate the light input from corresponding phase modulators phase modulators 614, 624 and 634 and output the collimated light to lenses 616, 626 and 636, respectively.

Lenses 616, 626 and 636 condense the light input from corresponding lenses 615, 625 and 635 so as to illuminate amplitude modulators 617, 627 and 637, respectively.

Light beams that have been phase modulated by phase modulator 614, 624 and 634, and that have passed through lenses 615 and 616, lenses 625 and 626 and lenses 635 and 636, respectively, are formed into the Fourier transform images, which are radiated on respective amplitude modulators 617, 627 and 637.

Amplitude modulators 617, 627 and 637 amplitude modulate the radiated Fourier transform images in accordance with the image signal, and output the amplitude-modulated light to cross prism 641.

Cross prism 641 combines the light output from amplitude modulators 617, 627 and 637 and outputs the combined light to optical projection system 108.

As shown in FIG. 6, it is possible that, for each of light sources 501-1 to 501-3, the light output from the individual light source is formed into a Fourier transform image first, and then the resultant Fourier transform images is combined by cross prism 614.

Here, in FIGS. 5 and 6, the number of light sources should not be limited to three, but the number of light sources may be two or equal to four or above.

The Second Exemplary Embodiment

Figure 7:
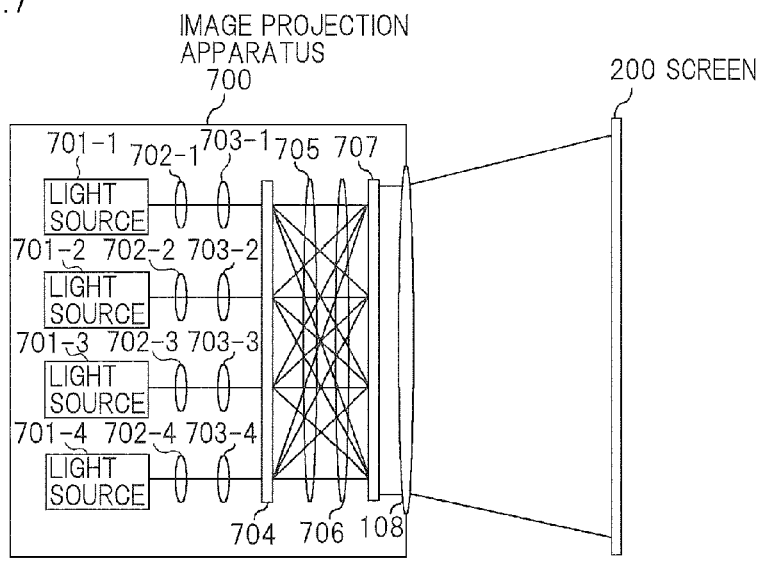
FIG. 7 A schematic structural diagram showing an image projection apparatus of the second exemplary embodiment of the present invention.

FIG. 7 is a schematic structural diagram showing image projection apparatus 700 of the second exemplary embodiment of the present invention. Here in FIG. 7, the same components as those in FIG. 1 are allotted with the same reference numerals and description is accordingly omitted.

Image projection apparatus 700 shown in FIG. 7 includes light sources 701-1 to 701-4, lenses 702-1 to 702-4, 703-1 to 703-4, phase modulator 704, lenses 705, 706, amplitude modulator 707 and optical projection system 108. In FIG. 7, the illustration of the controller is omitted.

As shown in FIG. 7, light sources 701-1 to 701-4 are provided with lenses 702-1 to 702-4 and 703-1 to 703-4, respectively.

Light sources 701-1 to 701-4 each output coherent light (laser beam) to corresponding lenses 702-1 to 702-4.

Lenses 702-1 to 702-4 magnify the output light from corresponding light source 701-1 to 701-4 and output the magnified light to corresponding lenses 703-1 to 703-4, respectively.

Lenses 703-1 to 703-4 each collimate the output light input from corresponding lens 702-1 to 702-4 and output the collimated light to phase modulator 704.

Phase modulator 704 performs phase modulation on the light input from lenses 703-1 to 703-4 and outputs the phase-modulated light to lens 705. Here, though description with FIG. 7 will be made by giving an example in which only one phase modulator 704 is provided, the phase modulator may be provided for each of the light sources.

Lens 705 collimates the light input from phase modulator 704 and outputs the collimated light to lens 706.

Lens 706 condenses the light input from lens 705 so as to illuminate amplitude modulator 707.

Light that has been phase modulated by phase modulator 704 and that has passed through lens 705 and lens 706, is formed into the Fourier transform image, which is radiated on amplitude modulator 707. Here, even if only one phase modulator 704 is provided, it is possible to create Fourier transform images independent from each other, from the light output from individual light sources, by spatially separating the irradiated area on phase modulator 704 with the laser light output from each light source from that of the others. Further, it is assumed in the present exemplary embodiment that lens 705 and lens 706 are designed so that the Fourier transform image created by the light output from each light source is radiated on a different area of amplitude modulator 707 from that of the others.

Amplitude modulator 707 performs amplitude modulation on the radiated Fourier transform image in accordance with the image signal and outputs the amplitude-modulated light to optical projection system 108.

Figure 8A:
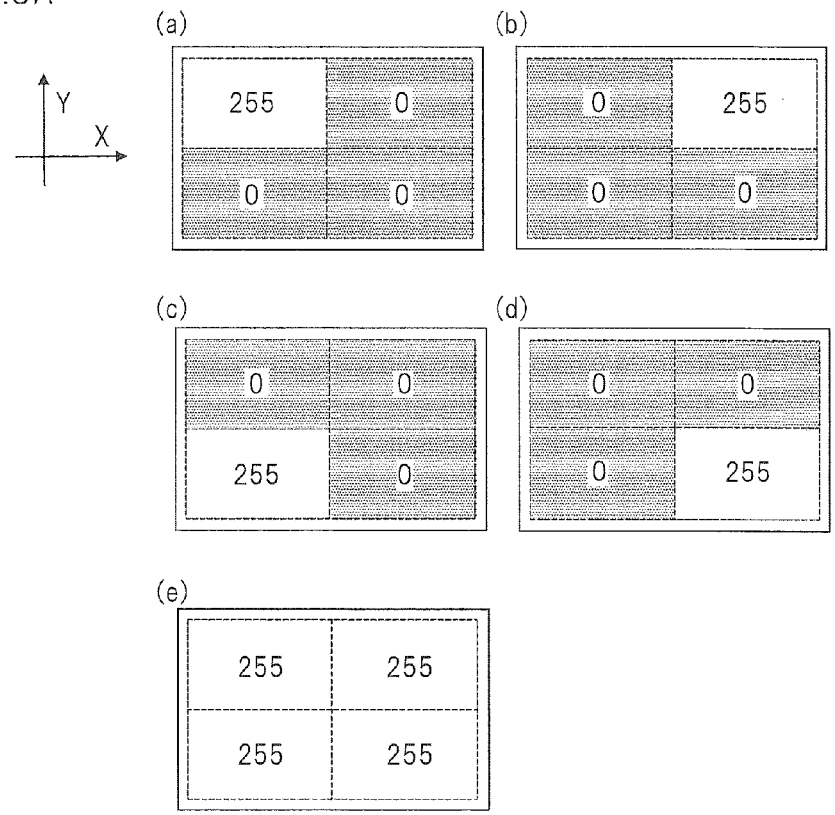
FIG. 8A A diagram showing one example of light intensity profiles of Fourier transform images formed by the light output from individual light sources shown in FIG. 7 and the light intensity profile of the Fourier transform image radiated on the amplitude modulator.

FIG. 8A is a diagram showing one example of light intensity profiles of Fourier transform images formed by the light output from light sources 701-1 to 701-4 and the light intensity profile of the Fourier transform image radiated on amplitude modulator 707. FIG. 8A(a) shows the light intensity profile of a Fourier transform image formed by the output light from light source 701-1, FIG. 8A(b) shows the light intensity profile of a Fourier transform image formed by the output light from light source 701-2, FIG. 8A(c) shows the light intensity profile of a Fourier transform image formed by the output light from light source 701-3, FIG. 8A(d) shows the light intensity profile of a Fourier transform image formed by the output light from light source 701-4, and FIG. 8A(e) shows the light intensity profile of a Fourier transform image radiated on amplitude modulator 707.

In the light intensity profile shown in FIG. 8A(a), the luminance value of the upper left area of the Fourier transform image is 255, and the luminance value of the lower left, upper right and lower right areas is 0. In the light intensity profile shown in FIG. 8A(b), the luminance value of the upper right area of the Fourier transform image is 255, and the luminance value of the upper left, lower left and lower right areas is 0. In the light intensity profile shown in FIG. 8A(c), the luminance value of the lower left area of the Fourier transform image is 255, and the luminance value of the upper left, upper right and lower right areas is 0. In the light intensity profile shown in FIG. 8A(d), the luminance value of the lower right area of the Fourier transform image is 255, and the luminance value of the upper left, lower left and upper right areas is 0.

As described above, since the laser beams that are output from different light sources will not interfere with each other, the light intensity profile of the Fourier transform image radiated on amplitude modulator 707 is given by the sum of the light intensity profiles of the Fourier transform images formed by the output light from the individual light sources, as shown in FIG. 8(e).

In this way, according to the present exemplary embodiment, image projection apparatus 700 includes a plurality of light sources and radiates the Fourier transform image having a light intensity profile which is the sum of the light intensity profiles of the Fourier transform images formed by the output light from the individual light sources, on amplitude modulator 707.

As a result, it is possible to project the image represented by the image signal faithfully by appropriately combining the Fourier transform images created by the output light from the individual light sources. Further, the controller, not illustrated in FIG. 7, determines the target luminance value of each area in the Fourier transform image radiated on amplitude modulator 707 in accordance with the image signal, and controls the driving of the light source that forms the Fourier transform image to be radiated on that area, based on the determined target luminance value of the area. In this case, since the phase data to be input to phase modulator 704 does not necessarily need to be changed, it is possible to reduce the processing load on the controller. Further, since the phase data is not changed, when a CGH is used as phase modulator 704, it is possible to use the CGH fixed.

Although description with FIG. 8A was made by giving an example in which the light intensity profile of the Fourier transform image fainted by the output from individual light sources is assumed so that the luminance values in three among four areas of the Fourier transform image are set at 0, the embodiment should not be limited to this.

FIG. 8B is a diagram showing one example of light intensity profiles of Fourier transform images formed by the light output from light sources 701-1 to 701-4 and the light intensity profile of the Fourier transform image radiated on amplitude modulator 707. FIG. 8B(a) shows the light intensity profile of a Fourier transform image formed by the output light from light source 701-1, FIG. 8B(b) shows the light intensity profile of a Fourier transform image formed by the output light from light source 701-2, FIG. 8B(c) shows the light intensity profile of a Fourier transform image fainted by the output light from light source 701-3, FIG. 8B(d) shows the light intensity profile of a Fourier transform image formed by the output light from light source 701-4, and FIG. 8B(e) shows the light intensity profile of a Fourier transform image radiated on amplitude modulator 707.

In the light intensity profile shown in FIG. 8B(a), the luminance value of the upper left, lower left and upper right areas of the Fourier transform image is 85, and the luminance value of the lower right area is 0. In the light intensity profile shown in FIG. 8B(b), the luminance value of the upper left, upper right and lower right areas of the Fourier transform image is 85, and the luminance value of the lower left area is 0. In the light intensity profile shown in FIG. 8B(c), the luminance value of the upper left, lower left and lower right areas of the Fourier transform image is 85, and the luminance value of the upper right area is 0. In the light intensity profile shown in FIG. 8B(d), the luminance value of the lower left, upper right and lower right areas of the Fourier transform image is 85, and the luminance value of the upper left area is 0.

As described above, the laser beams that are output from different light sources will not interfere with each other, and the light intensity profile of the Fourier transform image radiated on amplitude modulator 707 is given by the sum of the light intensity profiles of the Fourier transform images formed by the output light from the individual light sources. Accordingly, for example, the luminance value of the upper left area in the Fourier transform image formed by the output light from each light source is 85 in the light intensity profiles shown in FIGS. 8B(a) to 8B(c) and 0 in the light intensity profile shown in FIG. 8B(d), so that the luminance value of the upper left area of the Fourier transform image radiated on amplitude modulator 707 results in 255, as shown in FIG. 8B(e). Similarly, in each area of the lower left, upper right and lower right areas, the luminance values of the Fourier transform images formed by the output light from the individual light sources are summed up, so that the Fourier transform image that has the light intensity profile shown in FIG. 8B(e) is input to amplitude modulator 707.

The Third Exemplary Embodiment

Next, the image projection apparatus of the third exemplary embodiment of the present invention will be described.

Figure 9:
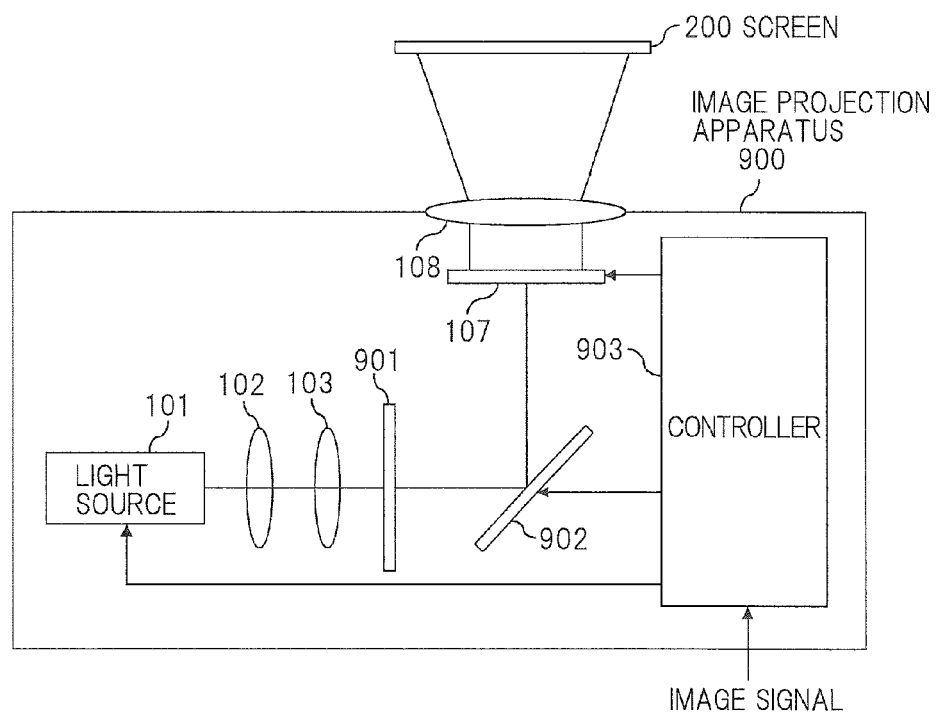
FIG. 9 A diagram showing a configuration of an image projection apparatus of the third exemplary embodiment of the present invention.

FIG. 9 is a diagram showing a configuration of image projection apparatus 900 of the third exemplary embodiment of the present invention. Here in FIG. 9, the same components as those in FIG. 1 are allotted with the same reference numerals and description is accordingly omitted.

Image projection apparatus 900 shown in FIG. 9 is different from image projection apparatus 100 shown in FIG. 1, in that phase modulator 104, lenses 105 and 106 are omitted, optical path deflector 901 and holographic medium 902 are added, and controller 109 is replaced by controller 903.

Optical path deflector 901 deflects the light output from lens 103 and outputs the deflected light to holographic medium 902.

Holographic medium 902 forms a reconstructed image from the light input from optical path deflector 901 and illuminates amplitude modulator 107. Herein, holograms have been recorded in advance on hologram medium 902 by radiating an object beam corresponding to a desired reconstructed image in order to be able to form a desired reconstructed image that is to be radiated on amplitude modulator 107. In recording holograms on holographic medium 902, the holograms may be recorded in multiple angles by changing the incident angle of the reference beam for each of different object beams. Alternatively, holograms may be recorded at physically different places by mechanically moving holographic medium 902.

Controller 903, in accordance with the input image signal, selects the reconstructed image that is to be used and the hologram corresponding to the reconstructed image, from the holograms recorded on holographic medium 902 and adjusts the incident angle of the laser beam (reference beam) output from light source 101 to holographic medium 902 by means of optical path deflector 901 so as to form the desired reconstructed image. It is also possible to provide a mechanism for mechanically moving holographic medium 902 instead of optical path deflector 901 so as to move holographic medium 902 by the mechanism to form the desired reconstructed image.

The object beam for recording a hologram on holographic medium 902 may be passed through a diffusion plate that provides a desired light intensity distribution in the image to the transmitted light and then is radiated on holographic medium 902. Since the light intensity distribution in the reconstructed image is given as the intensity distribution of the transmitted light that has been transmitted through the diffusion plate by radiating the object light via the diffusion plate, the incident angle of the laser beam to amplitude modulator 107 is multiplexed, so that it is possible to reduce speckles as a result of using the laser beam in the displayed image projected on screen 200.

Also, the incident angle of the laser beam to amplitude modulator 107 is multiplexed by changing the incident angle of the laser beam to holographic medium 902 by means of optical path deflector 901 temporally, so that it is possible to reduce speckles as a result of using the laser beam in the displayed image projected on screen 200. Herein, the incident angle of the laser beam to holographic medium 902 may be varied temporally so as to either reconstruct the same hologram or successively reconstruct the holograms that have been recorded by angular-multiplexing the same object beam.

Further, for example, by using a linear MEMS mirror as optical path deflector 901 so as to scan the laser beam by means of the MEMS mirror to temporally vary the incident angle of the laser beam to holographic medium 902, or by mechanically moving holographic medium 902 so as to form appropriate reconstructed images on a frame basis, it is possible to realize local dimming and reduce speckles as a result of using the laser beam in the displayed image.

The present invention has been described with reference to the embodiments. However, it should be understood by those skilled in the art that the structure and details of the present invention may be changed in various manners without departing from the scope of the present invention.

What is claimed is:

1. An image projection apparatus for projecting an image represented by an input image signal, comprising:
    a light source that outputs coherent light;
    a phase modulator that performs phase modulation on the light output from said light source to create a Fourier transform image;
    an amplitude modulator that performs amplitude modulation on the Fourier transform image in accordance with said image signal;
    a projection optical system that projects the light that has been amplitude modulated by said amplitude modulator; and,
    a controller that divides the image represented by the image signal into a plurality of divided images, determines a target luminance value of each of areas of the Fourier transform image that is divided corresponding to the division of the image, based on said image signal of the divided image corresponding to an area, and outputs phase data indicating an amount of phase modulation on the output light from said light source so as to make a luminance value of each area of the Fourier transform image acquire the target luminance value of the associated area.

2. The image projection apparatus according to claim 1, wherein said controller controls the driving of said light source based on the target luminance value of each area of the Fourier transform image.

3. The image projection apparatus according to claim 1, wherein said controller controls the driving of the amplitude modulator based on the target luminance value of each area of the Fourier transform image.

4. The image projection apparatus according to claim 1, wherein
    said controller stores in association with a light intensity profile that indicates the target luminance values of the individual areas of the Fourier transform image and the phase data that makes the luminance value of each area of the Fourier transform image acquire the target luminance value of each area indicated by the light intensity profile, determines the light intensity profile corresponding to said image signal, from the stored light intensity profiles, and outputs the phase data being stored in association with the determined light intensity profile, to said phase modulator.

5. The image projection apparatus according to claim 1, wherein said controller divides one frame of an image represented by said image signal into a plurality of subframes, and determines the target luminance value of each area in the Fourier transform image, on a subframe basis.

6. The image projection apparatus according to claim 1, wherein a plurality of said light sources are provided, and said phase modulator performs phase modulation on the light output from each of said plural light sources and radiates the light beams that have been output from said plural light sources and that has been phase modulated, onto different areas of said amplitude modulator.

7. The image projection apparatus according to claim 1, wherein the phase modulator comprises a hologram.

8. A control method for an image projection apparatus that includes a light source that outputs coherent light to project an image represented by an input image signal by modulating the light output from said light source in accordance with said image signal, comprising:
   performing phase modulation on the light output from said light source to create a Fourier transform image;
   performing amplitude modulation on the Fourier transform image in accordance with said image signal; and
   projecting the amplitude-modulated light, wherein the phase modulation is performed by dividing the image represented by said image signal into a plurality of divided images, determining a target luminance value of each of areas of the Fourier transform image that is divided corresponding to the division of the image, based on the image signal in the divided image corresponding to an area so as to make a luminance value of each area of the Fourier transform image acquire the target luminance value of the associated area.

* * * * *